United States Patent
Abe et al.

(10) Patent No.: US 10,022,940 B2
(45) Date of Patent: Jul. 17, 2018

(54) MULTIPLE PANE AND PRODUCTION METHOD OF MULTIPLE PANE

(71) Applicant: Panasonic Intellectual Property Management Co., Ltd., Osaka (JP)

(72) Inventors: Hiroyuki Abe, Osaka (JP); Eiichi Uriu, Osaka (JP); Kenji Hasegawa, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 14/771,486

(22) PCT Filed: Aug. 21, 2013

(86) PCT No.: PCT/JP2013/004936
§ 371 (c)(1),
(2) Date: Aug. 28, 2015

(87) PCT Pub. No.: WO2014/136151
PCT Pub. Date: Sep. 12, 2014

(65) Prior Publication Data
US 2016/0001524 A1 Jan. 7, 2016

(30) Foreign Application Priority Data
Mar. 4, 2013 (JP) .................... 2013-041519

(51) Int. Cl.
*E06B 3/677* (2006.01)
*B32B 17/06* (2006.01)
(Continued)

(52) U.S. Cl.
CPC .............. *B32B 17/06* (2013.01); *E06B 3/6612* (2013.01); *E06B 3/673* (2013.01); *E06B 3/6775* (2013.01);
(Continued)

(58) Field of Classification Search
CPC ........ E06B 3/6612; E06B 3/6775; E06B 3/673; E06B 3/677
See application file for complete search history.

(56) References Cited

U.S. PATENT DOCUMENTS

| | | | |
|---|---|---|---|
| 3,990,201 A | 11/1976 | Falbel | |
| 5,657,607 A | 8/1997 | Collins et al. | |
| 2004/0253395 A1* | 12/2004 | Amari | C03C 27/06 428/34 |

FOREIGN PATENT DOCUMENTS

| | | |
|---|---|---|
| CN | 202322639 U | 7/2012 |
| EP | 0719609 A2 | 7/1996 |

(Continued)

OTHER PUBLICATIONS

English translation of Chinese Office Action dated Nov. 10, 2016 in Chinese Patent Application No. 201380074110.6.

(Continued)

*Primary Examiner* — Donald J Loney (57) ABSTRACT

The multiple pane includes: a first glass panel; a second glass panel disposed facing the first glass panel with a predetermined interval in-between; and a hermetically-bonding member hermetically bonding peripheries of the first glass panel and the second glass panel to form a hermetically-enclosed space between the first glass panel and the second glass panel. The multiple pane further includes an adsorbing member which is fixed on a surface of the first glass panel so as to be inside the hermetically-enclosed space, has a height equal to or less than a length of the predetermined interval, and is for adsorbing a gas inside the hermetically-enclosed space. The hermetically-enclosed space is made to be in a reduced-pressure state.

3 Claims, 4 Drawing Sheets

(51) Int. Cl.
    *E06B 3/66*     (2006.01)
    *E06B 3/673*    (2006.01)
(52) U.S. Cl.
    CPC ..... *B32B 2307/304* (2013.01); *B32B 2509/10* (2013.01); *Y02A 30/25* (2018.01); *Y02B 80/24* (2013.01)

(56) References Cited

FOREIGN PATENT DOCUMENTS

| | | |
|---|---|---|
| JP | 5-501896 | 1/1998 |
| JP | 2003-137612 A | 5/2003 |
| JP | 2004-149343 A | 5/2004 |
| JP | 2005-231930 A | 9/2005 |
| JP | 2008-63158 A | 3/2008 |
| JP | 2010-83720 A | 4/2010 |
| WO | 91/02878 A1 | 3/1991 |

OTHER PUBLICATIONS

Extended European Search Report dated Jan. 21, 2016 issued in European Patent Application No. 13877407.0.
International Search Report dated Nov. 26, 2013 issued in International Patent Application No. PCT/JP2013/04936 (English translation).
European Office Action dated Oct. 27, 2016 issued in European Patent Application No. 13877407.0.

\* cited by examiner

MULTIPLE PANE AND PRODUCTION METHOD OF MULTIPLE PANE

RELATED APPLICATIONS

This application is the U.S. National Phase under 35 U.S.C. § 371 of International Application No. PCT/JP2014/004936, filed on Aug. 21, 2013 which in turn claims the benefit of Japanese Patent Application No. 2013-041519 filed on Mar. 4, 2013, the disclosures of which applications are incorporated by reference herein.

TECHNICAL FIELD

The present disclosure relates to a multiple pane in which a pair of glass panels are stacked with a reduced-pressure space in-between, and a production method of the multiple pane.

BACKGROUND ART

There has been commercialized a multiple pane with a structure in which a pair of glass panels are arranged facing each other and spaced at a predetermined interval, and the pair of glass panels are hermetically bonded with a hermetically bonding member at peripheries thereof to form a space inside the multiple pane, and the space is made to be in a reduced-pressure state by evacuating air inside the space.

It is expected that the multiple pane in which the pressure of the inside space is reduced shows great thermally insulating effects, dew prevention effects, and sound insulating effects, as a result of presence of a vacuum layer whose pressure is lower than the atmospheric pressure between the pair of glass panels, relative to a multiple pane constituted by two glass plates simply bonded to each other. Therefore, such multiple pane attracts great attentions as one of eco glass in current situations in which the importance of energy strategy rises.

Such a multiple pane is produced as follows. A pair of glass panels are arranged facing each other and are spaced at a predetermined interval with multiple spacers of metal, ceramic, or the like in-between. A hermetic seal made of low-melting-point frit glass is applied and heated to hermetically bond peripheries of the pair of glass panels, and thereby a hermetically-enclosed space is formed between the pair of glass panels. Thereafter, air inside the hermetically-enclosed space is evacuated through an outlet formed in one glass panel and an evacuation pipe made of glass or metal, and finally a tip of the evacuation pipe is sealed by melting so as to hermetically enclose the hermetically-enclosed space. As a result, the multiple pane is produced.

In another production method, a pair of glass panels arranged facing each other with spacers in-between are placed inside a reduced-pressure chamber in a reduced-pressure state, and peripheries of the glass panels are hermetically bonded with a hermetic seal. In another production method, an evacuation pipe is provided to part of a hermetic seal between a pair of glass panels with a hermetically enclosed space in-between, and then air is evacuated from the hermetically enclosed space.

However, in any production method, gas adsorbed on a glass surface may be discharged after sealing and this is likely to lead to increase in internal pressure. In view of this, a multiple pane with a reduced-pressure space includes an adsorbing member for adsorbing gas such as nitrogen, oxygen, and moisture which is to be discharged after sealing.

The space inside the multiple pane has a thickness of about 0.1 mm to 0.2 mm and therefore is very thin, and thus it is necessary to dispose a thin adsorbing member. As a result, a volume of the adsorbing member inside the space may decrease. However, when an area for bearing the adsorbing member is greatly increased in order to increase a volume of the adsorbing member, the appearance is likely to be poor. When a solid adsorbing member is disposed inside the reduced-pressure space, the solid adsorbing member is likely to move in transporting, for example. Therefore, it is difficult to dispose the adsorbing member at a fixed position.

In order to solve the above problems, in conventional multiple panes, for example, an internal face of a glass panel of a multiple pane is partially removed to form a recess, and a solid adsorbing member is disposed in the recess (see Patent Literature 1). Further, there has been proposed a method of disposing an adsorbing member in an outlet (see Patent Literature 2).

CITATION LIST

Patent Literature

Patent Literature 1: JP 2004-149343 A
Patent Literature 2: JP 2003-137612 A

SUMMARY OF INVENTION

The multiple pane includes: a first glass panel; a second glass panel disposed facing the first glass panel with a predetermined interval in-between; a hermetically-bonding member hermetically bonding peripheries of the first glass panel and the second glass panel to form a hermetically-enclosed space between the first glass panel and the second glass panel; and an adsorbing member which is fixed on a surface of the first glass panel so as to be inside the hermetically-enclosed space, has a height equal to or less than a length of the predetermined interval between the first glass panel and the second glass panel, and is for adsorbing a gas inside the hermetically-enclosed space. The hermetically-enclosed space is made to be in a reduced-pressure state.

Due to this configuration, it is possible to facilitate arrangement of the adsorbing member, and therefore provide a high-quality multiple pane.

DESCRIPTION OF EMBODIMENTS

Hereinafter, the multiple panes and the production methods of the multiple panes of the present disclosure are described with reference to embodiments, but are not limited to these embodiments. Note that, in some cases, excessively detailed explanations may be omitted. For example, detailed descriptions for well-known matters and duplicated descriptions for substantially the same configurations may be omitted. This is because of avoiding the following descriptions being unnecessarily redundant, and of facilitating understandings of skilled persons. Although the present inventors provide the attached drawings and the following descriptions in order that skilled persons can sufficiently understand the present disclosure, the present inventors do not have any intent to limit the subject-matters of claims thereby.

Note that, in the present disclosure, the phrase that the pressure of the space (hermetically-enclosed space) between the glass panels is reduced means that the space formed between the glass panels is made to be in a state in which the pressure is lower than an outside atmospheric pressure. Further, the reduced-pressure state in the present disclosure means a state in which the pressure of an inside of the space is lower than the outside atmospheric pressure, and thus may include a so-called vacuum state obtained by reducing the pressure by evacuating air from the space, irrespective of the degree of vacuum. Further, a state resulting from evacuating air inside the space and then filling the space with at least one of various gases such as an inert gas is included in the reduced-pressure state of the present disclosure, provided that the pressure of the gas inside the space is finally lower than the atmospheric pressure.

Note that, for convenience of explanation, the drawings referred below relate to the multiple panes and the production methods of the same of the present disclosure, and illustrate in a simplified manner mainly portions necessary for describing the disclosure. Therefore, the multiple panes described with reference to the drawings may have any configuration which is not shown in the drawings referred. Furthermore, dimensions of members shown in the drawings do not necessarily reflect dimensions and dimensional ratios of members in practice, exactly.

Embodiment 1

Figure 1:
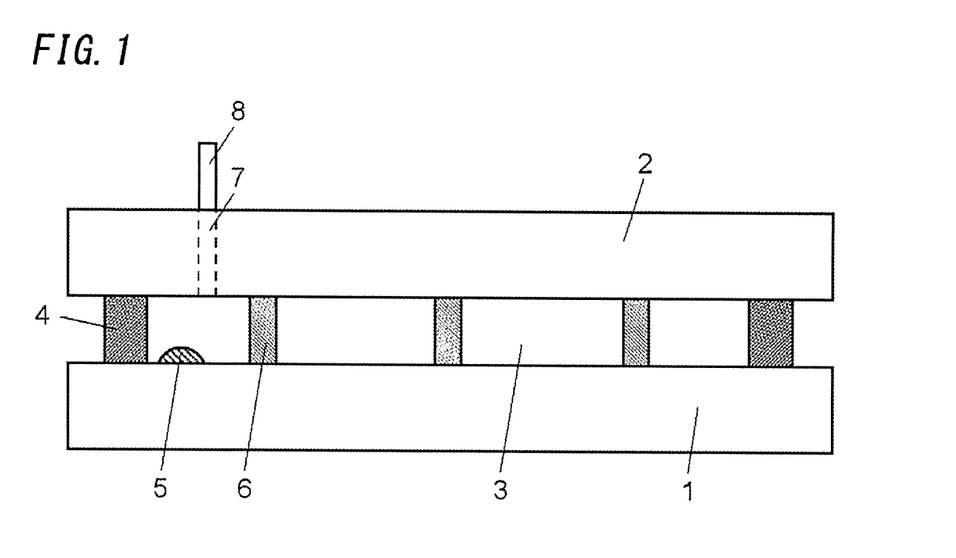
FIG. 1 is a section illustrating a multiple pane of one embodiment.
Figure 2:
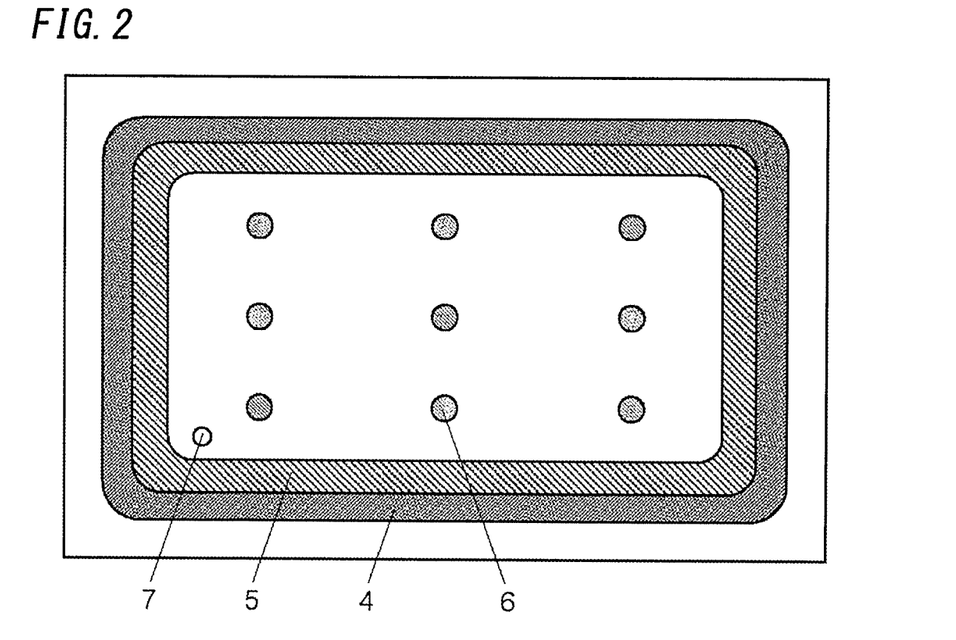
FIG. 2 is a plan illustrating the multiple pane of the embodiment.

FIG. 1 and FIG. 2 are explanatory views illustrating one example of a production method of a multiple pane according to the present embodiment. FIG. 1 is a section illustrating a structure in which an adsorbing member is formed inside a space between a pair of glass panels disposed facing each other. FIG. 2 is a plan illustrating the same structure in which an adsorbing member is formed inside a space between a pair of glass panels disposed facing each other.

As shown in FIG. 1, a multiple pane includes: a glass panel 1 serving as a first glass panel; a glass panel 2 serving as a second glass panel disposed facing the glass panel 1 with a predetermined interval in-between; and a hermetically-bonding member 4 hermetically bonding peripheries of the glass panel 1 and the glass panel 2 to form a hermetically-enclosed space 3 between the glass panel 1 and the glass panel 2. The hermetically-enclosed space 3 is made to be in a reduced-pressure state. Further, an adsorbing member 5 which has a height equal to or less than a length of the predetermined interval and is for adsorbing a gas inside the hermetically-enclosed space 3 is disposed by being fixed on a surface of the glass panel 1 so as to be inside the hermetically-enclosed space 3.

Spacers 6 are for keeping an interval between the glass panel 1 and the glass panel 2, and are arranged at almost regular intervals over a whole of the multiple pane. An outlet 7 is used for evacuating a gas inside the hermetically-enclosed space 3 to be in a reduced-pressure state, and is connected to an evacuation pipe 8. The evacuation pipe 8 is connected to a vacuum pump. A gas inside the hermetically-enclosed space 3 is evacuated through the evacuation pipe 8 and the outlet 7 to make the hermetically-enclosed space 3 in a reduced-pressure state, and then the evacuation pipe 8 is sealed.

The glass panel 1 and the glass panel 2 are main components constituting the multiple pane. The glass panel 1 and the glass panel 2 are arranged so that glass surfaces thereof are substantially in parallel and the predetermined interval (distance) therebetween is kept.

The glass panels 1 and 2 used in the multiple pane described in the present embodiment may be selected from various glass panels made of soda-lime glass, high-strain glass, chemically toughened glass, non-alkali glass, quartz glass, Neoceram, physically toughened glass, and the like. Note that, in the present embodiment, the glass panel 1 and the glass panel 2 have the same shape and the same thickness. However, such glass panels may have different sizes and thicknesses. Further, the glass panel can be selected in accordance with its application from glass panels with various sizes including a glass panel which is several cm on a side and a glass panel which is in a range of about 2 m to 3 m on a side at maximum. Additionally, the glass panel can be selected in accordance with its application from glass panels with various sizes including a glass panel with a thickness in a range of about 2 mm to 3 mm and a glass panel with a thickness of about 20 mm.

A gas inside the hermetically-enclosed space 3 is evacuated through the outlet 7, and thereby the hermetically-enclosed space 3 formed between the glass panel 1 and the glass panel 2 is made to be a reduced-pressure hermetically-enclosed space.

The hermetically-bonding member 4 is provided between the glass panel 1 and the glass panel 2. The hermetically-bonding member 4 is bonded to the glass panel 1 and the glass panel 2, and forms the hermetically-enclosed space 3 between the glass panel 1 and the glass panel 2. The hermetically-bonding member 4 is arranged so as to adhere to opposite faces of the glass panel 1 and the glass panel 2 and surround peripheries of the opposite surfaces (see FIG. 1 and FIG. 2). Note that, in a concrete example, the hermetically-bonding member 4 may be made of a frit seal or the like.

In the present embodiment, the hermetically-bonding member 4 for hermetically bonding the peripheries of the glass panels 1 and 2 is made from low-melting frit glass. In more detail, by way of one example, it is possible to use a bismuth-based seal frit paste including 70% or more of $Bi_2O_3$, 15% or less of each of $B_2O_3$ and ZnO, and 5% or more of a mixture of organic substances such as ethylcellulose and terpineol This frit glass has a softening point of 434° C.

Note that, the frit glass used for the hermetically-bonding member 4 may be selected from lead-based frit and vanadium-based frit in addition to the bismuth-based frit. Further, seal made of low-melting metal or resin may be used for the hermetically-bonding member as an alternative to the frit glass.

The adsorbing member 5 is provided inside the hermetically-enclosed space 3, and adsorbs a gas inside the hermetically-enclosed space. In the present embodiment, to prevent increase in pressure after hermetically enclosing for the hermetically-enclosed space 3, the adsorbing member 5 made of a powder is placed by being fixed to part, which is inside the hermetically-enclosed space 3, of the surface of the glass panel 1.

The spacers 6 are interval keeping members provided inside the hermetically-enclosed space 3 between the glass panel 1 and the glass panel 2 so as to keep an interval between the glass panel 1 and the glass panel 2 equal to at least the predetermined interval (distance).

As shown in FIG. 2, the multiple spacers 6 are arranged in a matrix in vertical and horizontal directions on the glass surface of the glass panel 1. Each of the multiple spacers 6 arranged in the multiple pane has a cylindrical shape with a diameter of 1 mm and a height of 100 μm, for example. The shape of the spacer 6 is not limited to the cylindrical shape shown in FIG. 1 and FIG. 2 and may be selected from various types of shapes such as a prism shape and a spherical shape. Further, the size of the spacer 6, is also not limited to the aforementioned instances, and may be appropriately selected in accordance with the size and thickness of the glass panel to be used.

Further, the spacer 6 of the multiple pane is made of photo-curable resin. The spacer 6 is formed by photolithography before the hermetically-bonding member 4 is applied on the glass surface of the glass panel 1, and in this photolithography, photo-curable resin is applied on the entire glass surface of the glass panel 1 to form a film with a predetermined thickness, and thereafter the film is exposed to light with a mask so as to cure desired parts of the film to form the spacers 6, and then undesired part of the film is removed by washing. By using the photolithography in this manner, the spacers 6 with the predetermined size can be disposed at the predetermined positions accurately. Note that, when the spacers 6 are made of transparent photo-curable resin, the spacers 6 can be less likely to be visually perceived when the multiple pane is used.

The material of the spacer 6 is not limited to the aforementioned examples, and may be selected from various materials which are not melted in a heating process described later. Further, instead of using the photolithography, spacers 6 made of material such as metal can be dispersedly fixed or bonded at predetermined positions in the surface of the glass panel facing the inside of the multiple pane. Note that, when the formation and arrangement of the spacers 6 are conducted without using the photolithography, it is preferable that the spacers 6 be in a spherical or cuboidal shape. In this case, even when the spacers 6 disposed on the surface of the glass panel are unintendedly directed in different directions, it is possible to accurately determine the distance between the pair of glass panels.

Note that, the multiple pane need not necessarily include the spacers 6, and may be devoid of the spacers 6.

In reducing the pressure inside the hermetically-enclosed space 3, the outlet 7 serves as an evacuation opening for allowing evacuation of a remaining gas inside the hermetically-enclosed space 3. The outlet 7 extends from the surface, facing the glass panel 1, of the glass panel 2 to the opposite surface of the glass panel 2 from the surface facing the glass panel 1. The outlet 7 is formed in a vicinity of a corner of the glass panel 2.

In reducing the pressure inside the hermetically-enclosed space 3, the evacuation pipe 8 serves as part of an evacuation path from the outlet 7 to an outside of the multiple pane.

Note that, in the multiple pane of the present embodiment, the evacuation pipe 8 is made of glass, and an inner diameter of the evacuation pipe 8 is equal to a diameter of the outlet 7, for example. The evacuation pipe 8 is connected to the outlet 7 by a conventional method such as glass welding and a method using molten metal used as welding material.

Next, a concrete method of fixing the adsorbing member 5 to the glass panel 1 or the glass panel 2 is described.

In the present embodiment, the adsorbing member 5 is fixed to the glass surface by application to the glass panel 1 or the glass panel 2. The adsorbing member 5 is made of a powder. Therefore, in the method of only blowing a powder for the adsorbing member 5 to the glass surface, it is difficult to adjust a shape of the adsorbing member 5, especially, a height of the adsorbing member 5 inside the hermetically-enclosed space 3. In view of this, in the present embodiment, a method of mixing material of the adsorbing member 5 with a solvent to prepare a solution and fixing the adsorbing member 5 by applying the solution on the glass surface is used. Hereinafter, this method is described in detail.

First, a powder of material of the adsorbing member 5 is mixed with a solvent at an appropriate concentration. For example, the powder for the adsorbing member 5 is a powder of a Fe—V—Zr alloy, and the solvent is IPA (isopropyl alcohol). In this case, a mixing ratio of powder to solvent is 10%. Thus, a solution for adsorbing member can be prepared.

Note that, the material of adsorbing member and the solvent are not limited to the above substances and may be other substances. For example, the material of adsorbing member may be adsorbent capable of adsorbing nitrogen, oxygen, and/or moisture, such as a Ba—Al alloy, a zeolite, and a powder of an ion-exchanged zeolite such as a copper-exchanged zeolite. Further, the solvent may be a generally used solvent such as ethanol and terpineol.

Next, the solution for the adsorbing member 5 is applied on a glass surface of the glass panel 1 or the glass panel 2 with a dispenser. In the present embodiment, to fix the adsorbing member to the glass surface of the glass panel 1 so as to be spaced a distance of 10 mm from the edge of the glass surface, the solution is supplied to a position on the glass surface which is to be inside the hermetically-enclosed space 3 and is spaced a distance of 10 mm from the edge of the glass surface. In this regard, a dimension of the adsorbing member 5 which is to be finally formed inside the hermetically-enclosed space 3 in a height direction (direction in which the glass surfaces of the glass panel 1 and the glass panel 2 face each other) is 50 μm at most. Therefore, an amount of the solution supplied to the glass surface is controlled to obtain the adsorbing member 5 with this height.

Note that, the height of the adsorbing member 5 can be adjusted by controlling the application speed, viscosity of the solution, the mixing ratio of the material of the adsorbing member to the solvent, or the like, in addition to the amount of the solution to be supplied. For example, it is possible to decrease the height of the adsorbing member obtained as a result of evaporation of solvent by decreasing the mixing ratio of material of the adsorbing member.

Note that, in the present embodiment, application is conducted with a dispenser. However, another method of application such as inkjetting and printing may be used.

After the solution containing the material of the adsorbing member 5 is applied on the glass surface, the solvent is dried. Drying may be natural drying, or forced drying with heating, blowing, or the like. By drying the solvent, the adsorbing member 5 can be fixed to the glass panel.

Note that, the clear reason why the adsorbing member 5 is fixed to the glass surface has not been clearly revealed yet. The adsorbing member 5 made of a power of an Fe—V—Zr alloy, a Ba—Al alloy, a zeolite, and a powder of an ion-exchanged zeolite such as a copper-exchanged zeolite tends to be negatively charged, and in contrast glass tends to be positively charged. Presumably, the adsorbing member 5 is fixed electrostatically.

Figure 3:
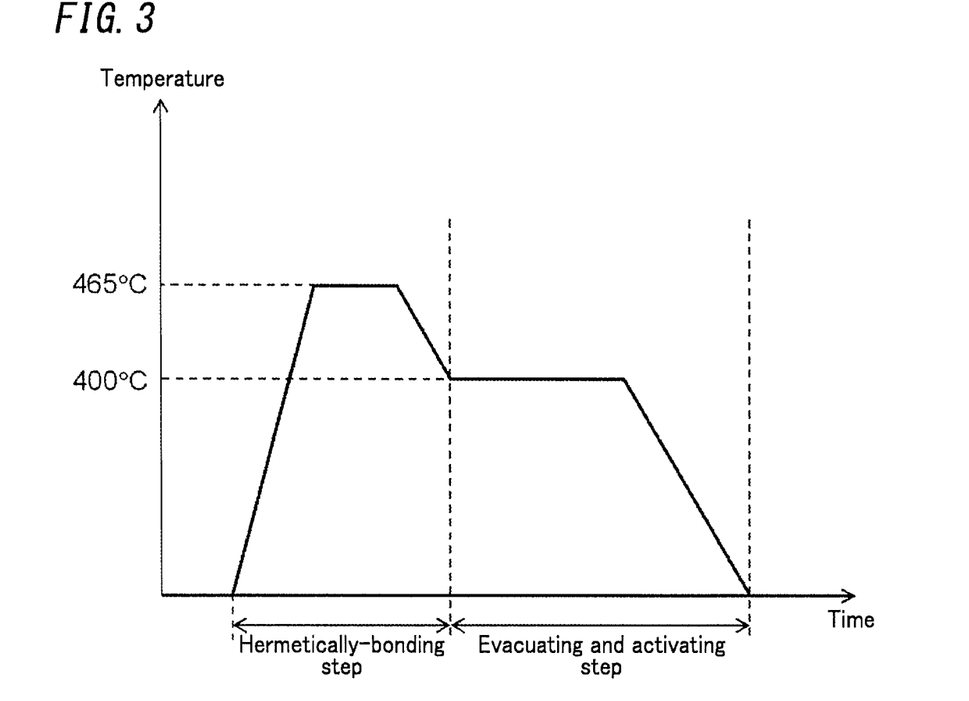
FIG. 3 is a diagram illustrating an example of a temperature condition in the production method of the multiple pane according to the embodiment.

FIG. 3 is a graph illustrating temperature conditions for a melting step of melting the hermetically-bonding member (frit seal) 4 and an evacuating step of evacuating a remaining gas inside the hermetically-enclosed space 3 between the glass panels 1 and 2 in the production method of the multiple pane of the present embodiment.

As shown in FIG. 3, first a desired temperature of a furnace is set to a temperature (e.g., 465° C.) higher than a softening point temperature of 434° C. of the glass frit used for the hermetically-bonding member 4. In this process, the hermetically-bonding member 4 starts to melt, and thus the peripheries of the glass panels 1 and 2 are hermetically bonded, and thereby the hermetically-enclosed space 3 is formed between the glass panels 1 and 2.

Subsequently, as shown in FIG. 3, the evacuating step begins. In the evacuating step, the temperature inside the furnace is temporarily decreased down to a temperature (e.g., 400° C.) equal to or less than the softening point temperature of 434° C. of the glass frit and simultaneously air is evacuated from the hermetically-enclosed space 3 through the outlet 7 and the evacuation pipe 8 with a vacuum pump. During the evacuating step, the temperature inside the furnace is kept lower than the softening point temperature of the hermetically-bonding member 4, the melted frit glass is pressed by atmospheric pressure and thereby spreads inside the multiple pane. Therefore, it is possible to suppress deterioration in appearance of the multiple pane. Note that, the above evacuating step is only an example, and the evacuation may be conducted at a temperature equal to or more than the softening point temperature.

In view of ensuring the thermally insulating properties necessary for the multiple pane, it is preferable that the degree of vacuum of the hermetically-enclosed space 3 be equal to or less than 0.1 Pa. The thermally insulating properties of the multiple pane increase with an increase in the degree of vacuum. However, to obtain the higher degree of vacuum, it is necessary to improve the performance of the vacuum pump and increase the evacuation period, and this may cause an increase in the production cost. Hence, in view of the production cost, it is preferable that the degree of vacuum be kept to a level sufficient to ensure the properties necessary for the multiple pane and be not increased more than necessary.

Next, as shown in FIG. 3, while the hermetically-enclosed space 3 is evacuated, the temperature of the furnace is kept at 400° C. for one hour to conduct an activating step for the adsorbing member 5. By doing so, a gas already adsorbed on the adsorbing member 5 is discharged, and the adsorbability is restored. Note that, a period of time for the activating step is not limited to the above example, and may be appropriately changed if necessary.

Then the temperature is decreased down to an ordinary temperature under a condition where the degree of vacuum of the hermetically-enclosed space 3 is equal to or less than 0.1 Pa, and subsequently the tip of the evacuation pipe 8 is sealed to hermetically enclose the hermetically-enclosed space 3. This process is so-called tip-off. By doing so, the hermetically-enclosed space 3 formed by the glass panel 1 and the glass panel 2 can be kept in a reduced-pressure state while the adsorbing member 5 in an activated state is disposed therein. Further, there is no need to cut glass, and therefore process cost can be lowered. Consequently it is possible to realize the multiple pane which is not poor in the strength and the appearance.

Note that, activation of the adsorbing member 5 is not required always. For example, the hermetically-enclosed space 3 may be formed by hermetically bonding the peripheries of the pair of glass panels 1 and 2 by heating at a temperature higher than the softening-point temperature of 434° C. of frit glass, and subsequently the multiple pane may be taken out from the furnace after the temperature is decreased down to an ordinary temperature. Thereafter, the inside of the multiple pane may be evacuated with an evacuation device and then tip-off may be conducted.

In this case, the melting step and the evacuating step can be conducted independently, and thus the furnace used in the melting step can be separate from the vacuum pump used in the evacuating step. As a result, the furnace can be simplified and downsized, and therefore the degree of sealing of the furnace can be improved, and consequently it is possible to reduce the necessary power consumption and shorten the time necessary for increasing the temperature. Further, the vacuum pump can be disposed at a position far from the furnace having a high temperature, and hence there is no need to take action to prevent equipment for chucking a vacuum valve of the vacuum pump and/or the evacuation pipe from having high temperature, and therefore the production equipment can be simplified.

In the hermetically-bonding step in FIG. 3, when the height of the adsorbing member 5 is more than the height of the spacer 6, the glass panel 2 is pressed by the atmospheric pressure, and is partially supported on the adsorbing member 5. Thus, the glass plate may be bent, and this may cause a gap between the hermetically-bonding member 4 and the glass panel 2. As a result, it is quite difficult to hermetically enclose the hermetically-enclosed space 3 which is a space to be hermetically enclosed (see FIG. 4).

Figure 4:
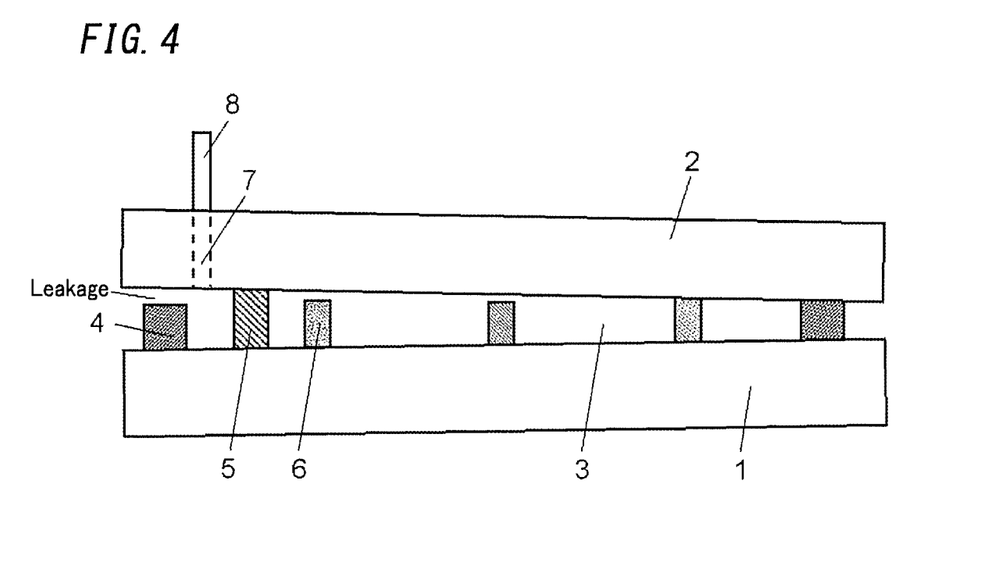
FIG. 4 is a section illustrating a case of a multiple pane of another embodiment in which the height of the adsorbing member is more than the height of the spacer.

In the present embodiment, in applying a solution containing material of the adsorbing member 5 to the glass panel 1 before the hermetically bonding step, a solvent to be mixed with material of the adsorbing member 5, a mixing ratio of material of the adsorbing member 5 to the solvent, a pressure of application set in applying the solution, an application speed, a type of the solvent, a type of material of the adsorbing member 5, and the like are appropriately selected so that the height of the adsorbing member 5 obtained as a result of drying and fixing is equal to or less than heights of the hermetically-bonding member 4, the spacer 6, and the like. Consequently leakage at the hermetically-bonding member 4 as shown in FIG. 4 can be prevented.

Note that, it is preferable that the height of the adsorbing member 5 be less than the distance between the glass surfaces of the glass panel 1 and the glass panel 2. This is because, when the adsorbing member 5 is in contact with both the glass panel 1 and the glass panel 2, heat may be transferred through the adsorbing member 5 from one of the glass panels to the other. When the height of the adsorbing member 5 is set to be small, the adsorbing member 5 is in contact with only one glass panel (the glass panel 1) but is not in contact with the other glass panel (the glass panel 2). Therefore, heat transfer through the adsorbing member 5 is extremely suppressed. Consequently, a thermally insulating property of the multiple pane can be hardly affected by presence of the adsorbing member 5.

Further, according to the method described with reference to the present embodiment, there is no need to preliminarily conduct processing (such as forming a recess) to part of the glass surface at which the adsorbing member 5 is to be disposed. The shape of the glass panel is not limited to a particular shape provided that application, drying, and fixing of the adsorbing member 5 can be conducted. Therefore, the adsorbing member 5 can be disposed on a substantially flat glass surface, or any of glass surfaces with recessed shapes, protruded shape, and combinations thereof. In view of this, according to the method of the present embodiment, it is possible to dispose the adsorbing member 5 more freely.

Additionally, there is no need to process part of a glass panel on which the adsorbing member 5 is to be positioned, and therefore it is possible to more easily form the adsorbing member on the glass panel.

Moreover, the multiple pane includes the adsorbing member, and therefore the internal pressure can be stabilized.

Modifications of Embodiment 1

Figure 5:
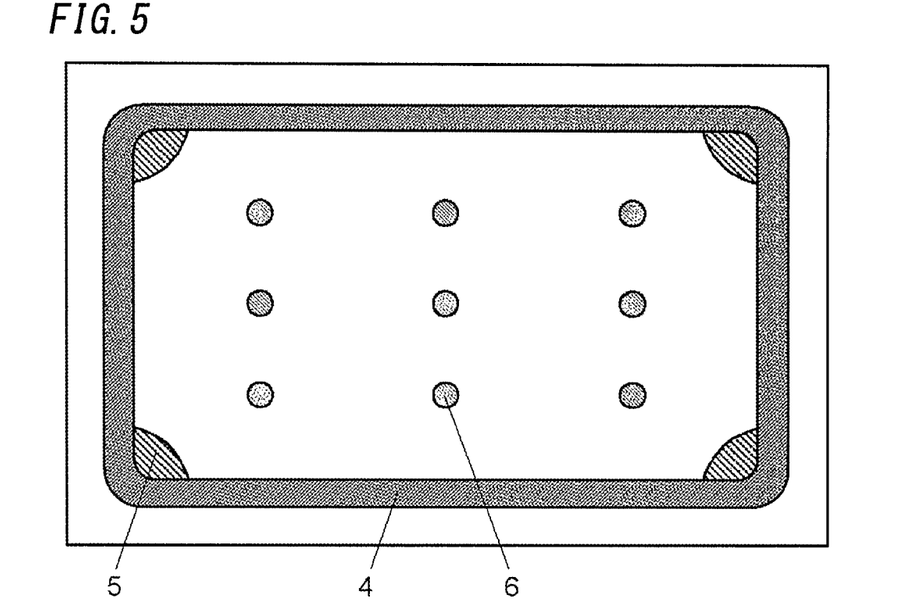
FIG. 5 is a plan illustrating an example in which the adsorbing members are provided in vicinities of four corners of a multiple pane of another embodiment.
Figure 6:
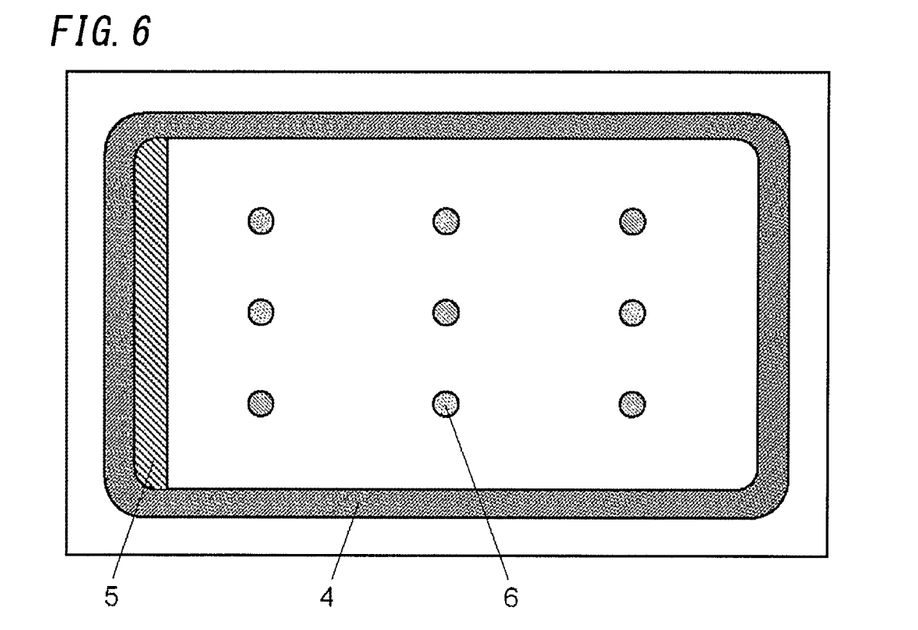
FIG. 6 is a plan illustrating an example in which the adsorbing member is provided to one side of the periphery of a multiple pane of another embodiment.
Figure 7:
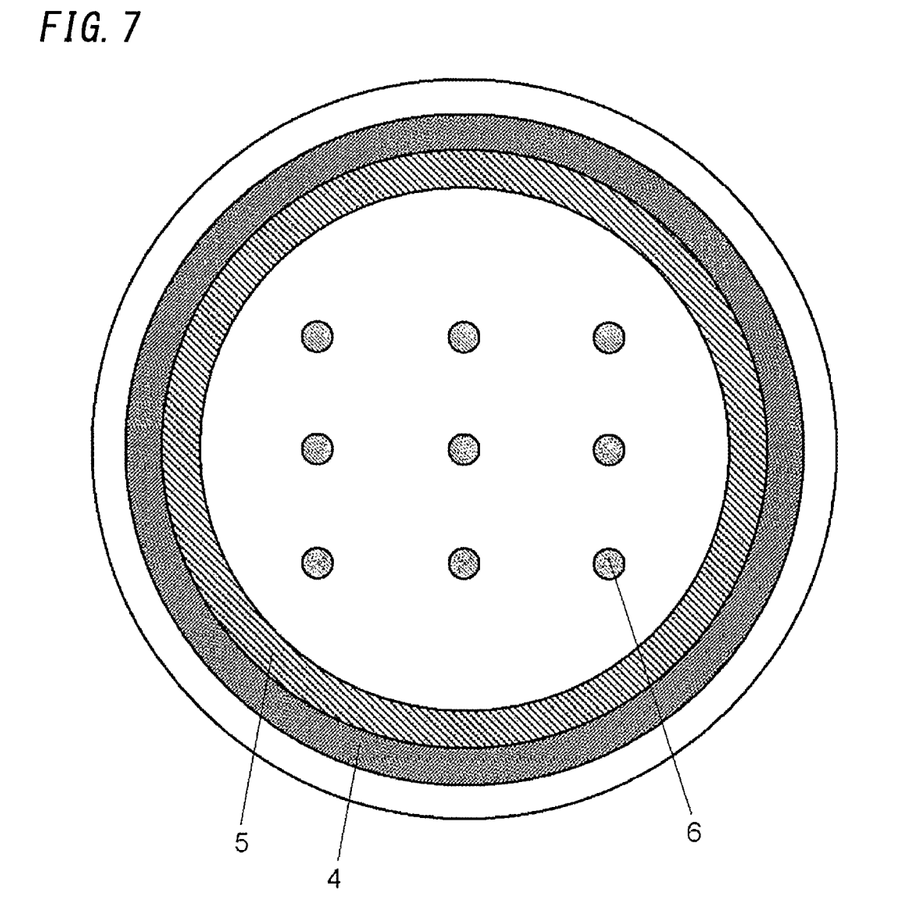
FIG. 7 is a plan illustrating an example in which the adsorbing member is provided to the entire periphery of a circular multiple pane of another embodiment.

FIG. 5, FIG. 6, and FIG. 7 are plans illustrating various modifications with the adsorbing members in different shapes.

FIG. 5 is a view illustrating an example in which adsorbing members 5 are disposed in vicinities of four corners of the multiple pane. In more detail, the hermetically-bonding member 4 constituting the multiple pane has a substantially quadrangular shape. The adsorbing members 5 are disposed in four corners of an area surrounded by the hermetically-bonding member 4.

According to this, the multiple pane is actually fitted with a window frame (sash) or the like, a predetermined area from the edge of the glass surface of the multiple pane is covered with the window frame. Therefore, the hermetically-bonding member 4 and the adsorbing member 5 are arranged to be included in the predetermined area. Hence, when the multiple pane is used as a glass window, it is possible to dispose the hermetically-bonding member 4 and the adsorbing member 5 on a place which is difficult to see.

FIG. 6 is a view illustrating an example in which an adsorbing member 5 is disposed in a vicinity of one of sides of the multiple pane. In more detail, the hermetically-bonding member 4 constituting the multiple pane has a substantially quadrangular shape. The adsorbing member 5 is disposed along one of sides of the hermetically-bonding member 4.

Hence, as with the example of FIG. 5, when the multiple pane is used as a glass window, it is possible to dispose the hermetically-bonding member 4 and the adsorbing member 5 on a place which is difficult to see.

FIG. 7 is a view illustrating an example in which the multiple pane is formed into a circular shape. In this case, the hermetically-bonding member 4 bonds the glass panel 1 and the glass panel 2 so as to have a circular shape. An adsorbing member 5 is disposed in an area surrounded by the hermetically-bonding member 4 so as to have a substantially circular shape as with the hermetically-bonding member 4.

Due to the method described with reference to the present embodiment, even when the adsorbing member 5 is disposed along a curved line, the adsorbing member 5 is formed by application. Therefore, it is possible to form the adsorbing member 5 relatively easily.

Note that, in the examples of FIG. 6 and FIG. 7, the adsorbing member 5 is disposed along the hermetically-bonding member 4 so as to extend along the entire length of the multiple pane as with the hermetically-bonding member 4. However, the present embodiment is not limited to these examples. For example, the adsorbing member 5 may not be disposed along the entire length of the hermetically-bonding member 4, and may be disposed corresponding to part of the hermetically-bonding member 4. In this case, it is possible to reduce a usage amount of material of the adsorbing member used in the multiple pane. A necessary amount of material of the adsorbing member varies depending on a size of a glass panel, a type of material of the adsorbing member, a hermetically-bonding process, and the like. Therefore, by selecting an appropriate application amount of material of the adsorbing member, it is possible to avoid use of an excess amount of material of the adsorbing member and consequently increase in cost can be suppressed.

In the case of producing, by one process (e.g., a production line), various multiple panes such as multiple panes different in their shape, multiple panes different in a shape of an area where material of adsorbing member is to be disposed, and multiple panes different in their size, it is possible to automatically measure a shape of a glass panel, a shape of an area where material of adsorbing member is to be disposed, a size of a glass panel and the like, and associate them with coordinates of application positions. Thereby, multiple panes can be produced automatically. Disposing material of the adsorbing member by application is more suitable for automation.

Note that, with regard to the multiple pane of the present disclosure, an evacuation pipe may be provided to a side surface of the multiple pane, and any hermetically-bonding method can be used. It is possible to dispose the adsorbing member inside the multiple pane without causing deterioration of the strength and the appearance.

Embodiment 2

By conducting evacuation with regard to the multiple pane inside a reduced-pressure chamber, it is possible to produce the multiple pane devoid of an evacuation pipe and outlet. In this case, after the hermetically-bonding member 4 is melted and the multiple pane is completely sealed, the multiple pane is moved away from the vacuum pump. Therefore, if a gas is discharged from a melted frit seal immediately after completion of sealing, such a gas cannot be evacuated with the vacuum pump, and in some cases an internal pressure is likely to increase.

In the present disclosure, the adsorbing member 5 disposed in the application method described with reference to embodiment 1 is used in the multiple pane devoid of an evacuation pipe and an outlet. The present disclosure can suppress deterioration of the appearance and the strength and also can suppress increase in the internal pressure, and therefore is particularly effective.

Modifications of Embodiments 1 and 2

In the multiple panes described with reference to aforementioned embodiments 1 and 2, at least one of the glass panel 1 and the glass panel 2 may be coated with one or more appropriate films such as low-emissivity organic films and low-emissivity inorganic films, and thereby the multiple panes can have various optical properties such as reflection prevention and ultraviolet absorption, thermally insulating properties, and/or the like. In this case, the adsorbing member 5 is formed on a glass panel which is one of the glass panel 1 and the glass panel 2 and is devoid of such films or has low emissivity. Thereby, it is possible to suppress increase in emissivity caused by formation of the adsorbing member 5.

Furthermore, it is possible to form a multiple pane in which three or more glass panels are stacked at predetermined intervals as a whole by replacing each of at least one of the glass panel 1 and the glass panel 2 by another multiple pane. In this case, it is sufficient that at least one part of a multiple pane in the thickness direction may be a multiple pane produced by the production method of the present disclosure. Therefore, a multiple pane produced by the production method of the present disclosure may be used in various ways, and for example, a multiple pane where a space between glass panels is filled with inert gas, a multiple pane produced by the production method of the present disclosure or another method, or a multiple pane in which glass panels are stacked at predetermined intervals but spaces therebetween have atmospheric pressure may be stacked on a multiple pane produced by the production method of the present disclosure. Moreover, glass panels may be various types of glass panels such as flat glass panels, curved glass panels, frosted glass, and the like.

The multiple panes produced by the production method of multiple panes of the present disclosure as described above have high thermally insulating effects, and can be preferably applied to window panes as eco glass easy in handling. Further, for example, when multiple panes produced by the production method of multiple panes of the present disclosure are disposed in doors of refrigerators and freezers, the multiple panes have high thermally insulating effects, and thus allow check of insides of refrigerators and freezers without interfering functions of refrigerators and freezers. Hence, it is expected that the multiple panes are used in household and business.

CONCLUSION

The multiple pane described in the present disclosure includes a first glass panel and a second glass panel. The first glass panel and the second glass panel are disposed so that glass surfaces of the first glass panel and the second glass panel face each other and are spaced at a predetermined interval. A hermetically-bonding member is provided between the first glass panel and the second glass panels, and extends along peripheries of the first glass panel and the second glass panels. The hermetically-bonding member adheres to the glass surfaces of the first glass panel and the second glass panel so as to form a hermetically-enclosed space between the first glass panel and the second glass panel. The hermetically-enclosed space formed by the first glass panel, the second glass panel, and the hermetically-bonding member is a space which has pressure reduced to be lower than a normal atmospheric pressure. An adsorbing member is provided inside this hermetically-enclosed space so as to adsorb a remaining gas inside the hermetically-enclosed space. The adsorbing member is fixed to at least part, which is present inside the hermetically-enclosed space, of the glass surface of the first glass panel.

According to the above structure, in the multiple pane, the hermetically-enclosed space formed by the first glass panel, the second glass panel, and the hermetically-bonding member is made to be in a reduced-pressure state, and thereby heat transfer from one glass panel to the other glass panel can be suppressed. The hermetically-enclosed space is in the reduced-pressure state, and therefore an amount of substance (gas) transferring heat is decreased. Consequently, the aforementioned effect can be achieved.

Additionally, the adsorbing member for adsorbing a remaining gas inside the hermetically-enclosed space is provided inside the hermetically-enclosed space. Therefore, it is possible to adsorb, on the adsorbing member, gaseous components in a process of producing the multiple pane and discharged from the first glass panel, the second glass panel, and the hermetically-bonding member with time. Therefore, it is possible to suppress deterioration with time which means that gas causing heat conduction spreads into the hermetically-enclosed space with time, and consequently the thermally insulating effect of the multiple pane is reduced.

Further, the height of the adsorbing member is less than the length of the predetermined interval between the first glass panel and the second glass panel, and therefore it is possible to prevent the adsorbing member from decreasing airtightness of the hermetically-enclosed space. Further, it is possible to suppress decrease in the thermally insulating property of the multiple pane which would otherwise occur when the hermetically-bonding member is in contact with both the first glass panel and the second glass panel.

As described above, it is preferable that the height of the adsorbing member be less than the length of the predetermined interval between the first glass panel and the second glass panel. In this case, it is possible to prevent a situation where the adsorbing member is in contact with both the first glass panel and the second glass panel and therefore serves as a medium for transferring heat from one glass panel to the other glass panel. As a result, it is possible to suppress decrease in the thermally insulating property of the multiple pane.

Furthermore, it is preferable that the adsorbing member be provided at a position within a predefined distance of an edge of a glass surface of the multiple pane. In more detail, the hermetically-bonding member forming the hermetically-enclosed space, and the adsorbing member are provided within the predefined distance of an edge of a glass panel. Consequently, when the multiple pane is combined with a window frame (sash) or the like, the hermetically-bonding member and the adsorbing member are concealed with the window frame, and therefore they can be less likely to be visually perceived. Note that, generally, this predefined distance is considered 15 mm.

The production method of the multiple pane described in the present disclosure includes the following steps. One of the above steps is a step of applying a solution containing material of the adsorbing member for adsorbing a remaining gas inside the hermetically-enclosed space on a glass surface of one glass panel. The hermetically-enclosed space is formed by the first glass panel, the second glass panel, and the hermetically-bonding member. The material of the adsorbing member is mixed with a solvent to prepare a solution. The solution is applied to a desired position on the first glass panel. In this process, the position to which the solution is to be applied is to be present inside the hermetically-enclosed space of the multiple pane.

A subsequent step of the above steps is a step of drying the solvent in the applied solution. By doing this step, only the material of the adsorbing member which is a solute is left on the glass surface, and therefore the solvent can be removed.

Thereafter, a step of causing discharge of a gas already adsorbed on the adsorbing member left on the glass surface is conducted. In more detail, the adsorbing member is heated so as to cause discharging of a gas adsorbed on the adsorbing member. This step may be performed together with a heating process performed in a step of bonding the hermetically-bonding member to the glass panels of the multiple pane by melting. Therefore, a heating process of the hermetically-bonding member and a heating process of the adsorbing member can be performed simultaneously.

Moreover, in addition to the above process, there is a step of conducting a pressure reducing process of the hermetically-enclosed space. In this step, for example, an evacuation pipe or the like connected to the hermetically-enclosed space is connected to a suction pump or the like, and then the pressure inside the hermetically-enclosed space is reduced.

By appropriately selecting a type of material of the above adsorbing member, a concentration and a type of a solvent, a mixing ratio of the material to the solvent, a method of applying a solution, and the like, it is possible to form the adsorbing member with desired height and width in the inside space of the multiple pane. Therefore, it is possible to realize the multiple pane which includes a sufficient volume of the absorbing member and can be made without a process of partially cutting glass and additionally is not poor in the strength and the appearance.

In the production method of the above multiple pane, it is preferable that, in mixing a powder of material of the adsorbing member with a solvent, the concentration, the solvent, the application speed, and the like be appropriately determined so that application can be conducted to form the adsorbing member having a height and a width in accordance with the height of the spacer, the reduced-pressure state of the inside, the purpose of use, and the like. By doing so, it is possible to dispose the adsorbing member with the appropriate volume and the desired shape inside the small space of the multiple pane.

Note that, in hermetically bonding and evacuating in the step of reducing the pressure inside the above hermetically-enclosed space, it is possible to produce the multiple pane which does not include an evacuation pipe or an outlet, by use of a method of performing evacuation inside the low-pressure chamber, a method of subsequently removing an evacuation pipe and an outlet, or the like. By doing so, the adsorbing member and the evacuation pipe are not present at portions other than the peripheral portions of glass panels, and therefore the appearance can be further improved.

In another preferable aspect, in the step of causing discharge of a gas adsorbed on the above adsorbing member, the adsorbing member is activated by heated in vacuum before enclosing. By doing so, it is possible to dispose inside the multiple pane the adsorbing member with a higher gas adsorbing property.

Alternatively, activation of the adsorbing member may be performed by: conducting hermetically bonding by heating the hermetically-bonding member at a periphery of the multiple pane up to the softening-point temperature; decreasing the temperature down to a temperature lower than the softening-point temperature; reducing the pressure inside the multiple pane; and keeping the high temperature for predetermined time. By doing so, the hermetically-bonding and evacuating process and the adsorbing member activating process can be conducted simultaneously.

In another preferable aspect, a height keeping member for keeping a gap between the first glass panel and the second glass panel is disposed at a portion on which the hermetically-bonding member is to be formed. According to this aspect, even at the peripheries at which the hermetically-bonding member is formed, the length of the gap between the pair of glass panels can be kept equal to a predetermined length.

Additionally, one or more spacers for keeping the interval between the pair of glass panels may be provided inside the hermetically-enclosed space. It is preferable that at least one of the spacer and the height keeping member be formed by photolithography. By using the photolithography, the spacer or the height keeping member having a predetermined shape can be disposed accurately at a predetermined position.

The aforementioned embodiments exemplify techniques of the present disclosure. For this purpose, the attached drawings and detailed descriptions are provided.

Hence, components disclosed in the attached drawings and detailed descriptions may include components necessary for solving problems, and also may include components which are unnecessary for solving problems but used for describing the above techniques. Therefore, although components unnecessary for solving problems are described in the attached drawings and detailed descriptions, such unnecessary components should not be immediately considered as being necessary.

Further, the aforementioned embodiments are prepared for describing the techniques of the present disclosure, and therefore modification, replacement, addition, omission, and the like can be conducted on the embodiments in various manners within a scope of claims and its equivalent range.

INDUSTRIAL APPLICABILITY

As described above, the multiple pane of the present disclosure has high reliability and is not poor in appearance, and therefore is useful.

REFERENCE SIGNS LIST

1, 2 Glass Panel
3 Hermetically-enclosed Space
4 Hermetically-bonding Member
5 Adsorbing Member
6 Spacer
7 Outlet
8 Evacuation Pipe

The invention claimed is:

1. A production method of a multiple pane which includes a first glass panel and a second glass panel, the production method comprising:
   an application step of applying a solution for an adsorbing member for adsorbing a gas inside a hermetically-enclosed space to be formed between the first glass panel and the second glass panel, on a glass surface of the first glass panel;
   a hermetically-bonding step of hermetically-bonding peripheries of the first glass panel and the second glass panel to form the hermetically-enclosed space between the first glass panel and the second glass panel;
   a pressure-reduction step of reducing a pressure inside the hermetically-enclosed space by evacuating a gas inside the hermetically-enclosed space;
   a fixing step of fixing the adsorbing member to the first glass panel by drying the solvent of the applied adsorbing member on the first glass surface; and
   a step of heating the adsorbing member on the first glass panel to cause discharging of a gas adsorbed on the adsorbing member while the hermetically-enclosed space is evacuated.

2. The production method of a multiple pane, according to claim 1, wherein the solution is applied so that the height of the adsorbing member is less than a length of an interval between the first glass panel and the second glass panel.

3. The production method of a multiple pane, according to claim 1, wherein in the application step for the adsorbing member, the solution is applied at a position within a predefined distance of an edge of the first glass panel.

\* \* \* \* \*